United States Patent [19]

Weir et al.

[11] Patent Number: 5,635,269
[45] Date of Patent: Jun. 3, 1997

[54] PRECISION-ETCHED TEXTURED STOP/START ZONE FOR MAGNETIC-RECORDING DISKS

[75] Inventors: Richard D. Weir, Agoura Hills; Carl W. Nelson, Hayward; Neil D. Heiman, Morgan Hill, all of Calif.

[73] Assignee: Tulip Memory Systems, Inc., Fremont, Calif.

[21] Appl. No.: 375,246

[22] Filed: Jan. 19, 1995

Related U.S. Application Data

[63] Continuation of Ser. No. 869,482, Apr. 15, 1992, abandoned.
[51] Int. Cl.$^6$ ........................................ G11B 5/66
[52] U.S. Cl. .................. 428/65.3; 428/65.6; 428/65.7; 428/336; 428/694 T; 428/694 SG; 428/694 TS; 428/694 NF; 428/694 TC; 428/694 TR; 428/698; 428/704; 428/900; 427/128; 427/129; 427/130; 427/131; 427/132; 369/272; 369/277; 369/283; 360/135
[58] Field of Search .................. 428/653, 655, 428/65.7, 336, 694 T, 694 SG, 694 TS, 694 NF, 694 TC, 694 TR, 698, 704, 900; 427/128, 129, 131, 130, 132; 365/272, 277, 283; 360/135

[56] References Cited

U.S. PATENT DOCUMENTS

| | | | |
|---|---|---|---|
| 3,900,592 | 8/1975 | Kennedy et al. | 427/569 |
| 4,565,772 | 1/1986 | Takeoke et al. | 430/320 |
| 4,614,705 | 9/1986 | Umehare | 430/270.21 |
| 4,698,251 | 10/1987 | Fukuda et al. | 428/65.7 |
| 4,743,481 | 5/1988 | Asada et al. | 428/35.7 |
| 4,743,491 | 5/1988 | Asada et al. | 428/35.7 |
| 4,839,207 | 6/1989 | Yoshitomi et al. | 428/64.5 |
| 4,877,666 | 10/1989 | Muchnik et al. | 428/64.3 |
| 4,911,967 | 3/1990 | Lazzari | 428/65.6 |
| 4,946,730 | 8/1990 | Inui et al. | 428/64.3 |
| 4,973,496 | 11/1990 | Kruger | 427/129 |
| 5,008,176 | 4/1991 | Kondo et al. | 430/270.11 |
| 5,062,021 | 10/1991 | Ranjan et al. | 360/135 |
| 5,108,781 | 4/1992 | Ranjan et al. | 427/556 |

FOREIGN PATENT DOCUMENTS

| | | |
|---|---|---|
| 0369784A2 | 5/1990 | European Pat. Off. . |
| 0447025A1 | 9/1991 | European Pat. Off. . |
| 59-217225 | 7/1984 | Japan . |
| 59-148129 | 8/1984 | Japan . |

OTHER PUBLICATIONS

Article entitled "Laser texturing for low-flying-height media," by R. Ranjan, D.N. Lambeth, M. Tromel, P. Goglia and Y. Li, of Seagate Technology, 7801 Computer Ave., Minneapolis, MN 55435.

Kurt D. Kennedy, et al., "Gas-Scattering and Ion-Plating Deposition Methods"; Airco Temescal Div., Air Reduction Company, Inc.; Sep. 15, 1971.

Kurt Kennedy, "Physical Vapor Deposition"; Airco Temescal; Apr. 19, 1972.

D.L. Chambers, et al., "Electron Beam Techniques For Ion Plating"; Airco Temescal; May 1971.

"New Developments In Ion Plating" *Viewport*, Issue No. 1, Airco Temescal; 1972.

(List continued on next page.)

*Primary Examiner*—Leszek Kiliman
*Attorney, Agent, or Firm*—Limbach & Limbach L.L.P.

[57] ABSTRACT

A magnetic-recording disk comprising a metal substrate disk having a textured annular first surface area with an outer diameter which is substantially less than the diameter of the metal substrate is disclosed herein. The metal substrate disk further has a smooth annular second surface area between the first surface area's outer diameter and the metal substrate's circumferential edge. The textured annular first surface area has a laser-etched circular pattern. Furthermore the metal disk substrate of an aluminum alloy, a titanium alloy, or an austenitic stainless steel has a thin-film coating selected from the group consisting of nitrides, carbides, or borides of titanium, zirconium, hafnium, vanadium, niobium, tantalum, chromium, molybdenum or tungsten.

19 Claims, 2 Drawing Sheets

OTHER PUBLICATIONS

Hugh R. Smith, Jr., "Current Developments In Ion Plating"; Airco Temescal; Mar. 23, 1972.

"Evaporation", Deposition Technologies For Films And Coatings; pp. 84–89, pp. 126–129; pp.126–129; Noyes Publications, 1982.

Donald M. Mattox, "Ion Plating Technology"; Deposition Technologies For Films And Coatings; pp. 244–287; Noyes Publications, 1982.

David W. Hoffman, et al., "Microstructural Control of Plasma–Sputtered Refractory Coatings"; Handbook of Plasma Processing Technology; pp. 483–517; Noyes Publications, 1990.

R.D. Bland, et al., "Effect Of Ion Bombardment During Deposition On Thick Metal And Ceramic Deposits"; *J. Vac. Sci. Technol.*, vol. 11, No. 4, Jul./Aug. 1974; pp. 671–674.

C.Y. Ting, et al., "Study Of Planarized Sputter–deposited $SiO^2$"; *J. Vac. Sci. Technol.*, 15(3), May/Jun. 1978; pp. 1105–1111.

T. Mogami, et al., "$SiO^2$ Planarization By Two–Step rf Bias–Sputtering"; *J. Vac. Sci. Technol.*, 83(3), May/Jun. 1985; pp. 857–861.

PRECISION-ETCHED TEXTURED STOP/START ZONE FOR MAGNETIC-RECORDING DISKS

This is a continuation of application Ser. No. 07/869,482 filed on Apr. 15, 1992, now abandoned.

FIELD OF THE INVENTION

The present invention relates to start/stop zones on magnetic-recording disks. More specifically, it relates to texturing a metal substrate disk of a magnetic-recording disk at the start/stop zone region and coating the metal substrate disk with a levelizing layer of metal.

BACKGROUND OF THE INVENTION

In a disk drive, while the disk drive is operating, the read/write head is positioned over the disk file. During operation, the magnetic-transducer's smooth slider air-bearing surface does not come into contact with the disk's surface. However, when the disk drive is turned off, the magnetic-transducer's air-bearing surface is parked on the start/stop zone of the disk where data is not kept. The start/stop zone is an annular area of the disk which is toward the inner diameter of the disk. The transducer's air-bearing surface comes into direct contact with the start/stop zone. To avoid stiction of the magnetic-transducer's smooth slider air-bearing surface when the parked read/write head is activated for operation, the start/stop zone as well as the entire surface of the disk is textured.

Commonly, disk texturing is provided in the following manner. The aluminum-alloy disk substrate of a magnetic-recording disk is coated with an electroless-deposited nickel-phosphorus alloy, which is nonmagnetic. The surface of the electroless-deposited-nickel-phosphorus-alloy-coated aluminum-alloy disk is lapped and polished prior to the subsequent plating or sputter-deposition of the magnetic layer. After polishing, the nickel-phosphorus-alloy-coated aluminum-alloy disk is textured by very light abrasion to provide a circumferential scratch pattern by pressing the disk against a rotating surface containing fine particles of alumina (corundum) ($Al_2O_3$) or of silicon carbide (SiC).

The process for obtaining this circumferential scratch pattern provides two distinct functions. First, the circumferential texturing grooves assist in alignment of the crystallites of the subsequently sputter-deposited chromium and cobalt-alloy thin-film layers with grain-boundary matching between these layers and the texture grooves. This phenomenon leads to an in-plane circumferential versus radial anisotropy, improving the read-signal parametrics of anisotropic cobalt-alloy films.

The second function of the circumferential scratch pattern is to provide adequate texturing in the start/stop zone. As noted above, in disk drives, the magnetic-transducer's smooth slider air-bearing surface comes into contact with the disk surface when the drive is turned off. Such texturing helps to avoid stiction of the head to the disk.

The head's slider material is usually a composite of aluminum oxide ($Al_2O_3$) and titanium carbide (TiC) and the load force on this slider against the disk can range from 5 to 12 grams. Typically, the textured surface is coated with outer layers consisting of a 100 nm layer of chromium (Cr), a 60 nm layer of magnetic material, a 20–30 nm layer of carbon (C), and a 2–3 nm layer of lubricant. Because these outer layers are very thin and provide very little protection against wear when the head comes into contact with the disk surface when the drive is turned off, the disk start/stop surface can become smoother after a few thousand contact start/stop cycles. Therefore, even though texturing had been initially provided, the start/stop zone may in fact become worn out. Then, when the drive is turned off and the two smooth surfaces come into contact, the friction at the head/disk interface will increase. This frictional force can reach a level where the transducer becomes stuck to the disk, causing the disk drive to fail due to the motor not having enough power to free the surfaces or to the motor starting force causing permanent damage to both surfaces.

Should deeper texturing grooves be used to provide a higher surface roughness which will assist in reducing friction at the head/disk interface, an increase of the flying height of the transducer in the data zone would result. The peak-to-valley height of exaggerated texturing grooves would become higher than the desired flying height of the transducer. Such a configuration would provide a serious limiting factor, in that drive designers seek configurations allowing the transducer to fly closer to the disk, therefore providing an increase in storage density.

OBJECTS AND SUMMARY OF THE INVENTION

It is therefore a general object of the present invention to provide a disk having a textured stop/start zone.

It is another object of the present invention to provide a smooth data zone allowing the transducer's air-bearing surface to fly close to the surface of the disk.

It is a further object of the present invention to provide a textured stop/start zone which does not wear down after prolonged used.

It is yet another object to provide a textured surface which does not have sharp edges which can impact with the transducer head, causing damage.

The foregoing and other objects of the invention are achieved by a magnetic-recording disk comprising a metal substrate disk having a textured annular surface area with an outer diameter which is substantially less than the diameter of the metal substrate. Furthermore, the metal disk substrate has a thin-film coating selected from the group consisting of nitrides, carbides, or borides of titanium, zirconium, hafnium, vanadium, niobium, tantalum, chromium, molybdenum, or tungsten. A layer of magnetic-recording material overlies the thin-film coating to create a magnetic-recording disk.

BRIEF DESCRIPTION OF THE DRAWINGS

Other objects, and many of the intended advantages of the present invention, will be readily appreciated as the same becomes better understood by reference to the following detailed description when considered in connection with the accompanying drawings wherein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the claims.

Figure 1:
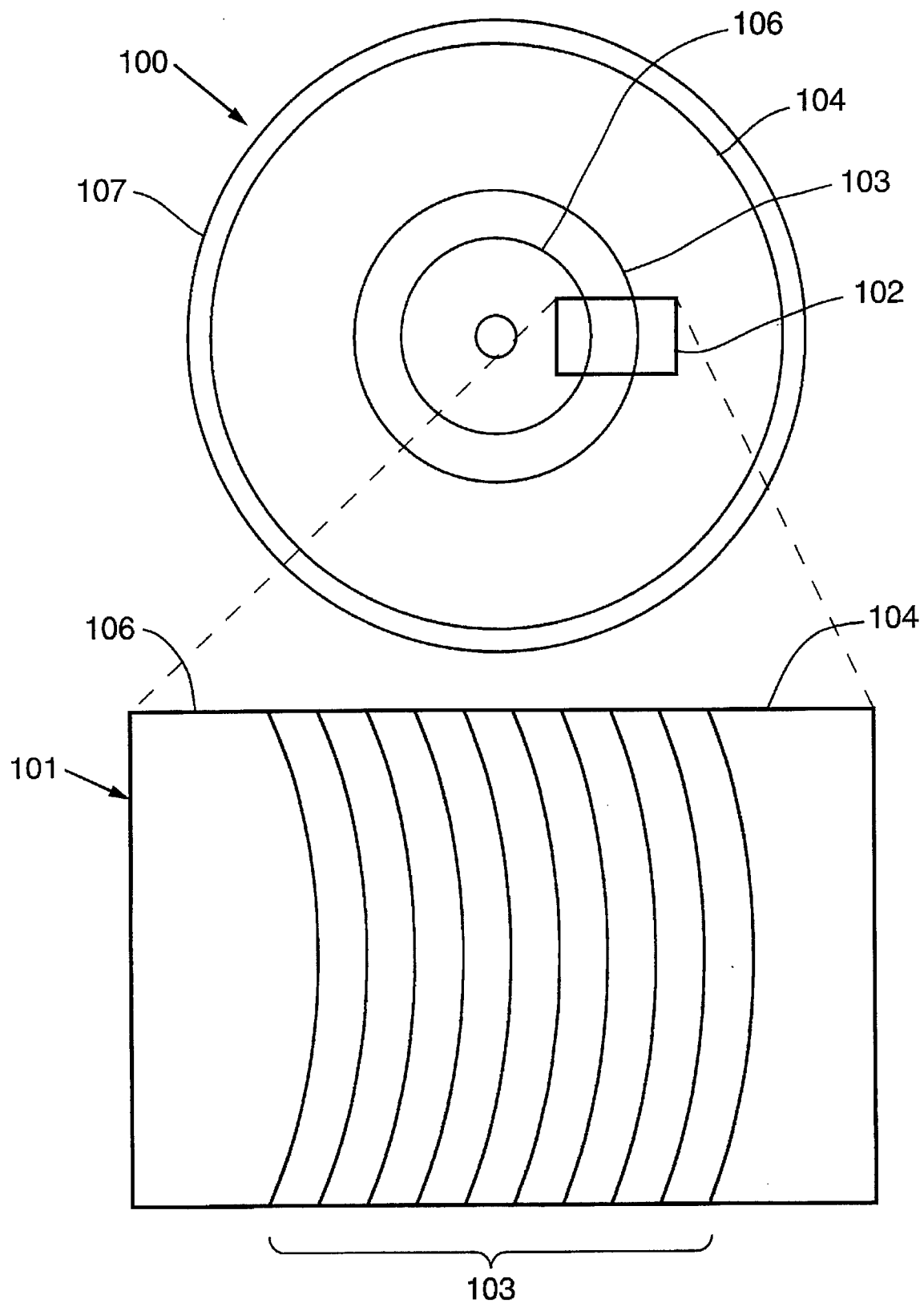
FIG. 1 shows a disk and an expanded view of the stop/start zone of the disk.

Attention is drawn to FIG. 1 showing a magnetic-recording disk 100 and an expanded view 101 of a portion 102 of the stop/start zone 103 of the disk 100. The areas around the stop/start zone 103, including the data zone 104 and the unused disk center portion 106 are also shown in the expanded view 101. As described above, the textured start/stop zone 103 is used for landing the transducer when the drive is turned off.

Typically, a disk's diameter is 130 mm at its circumferential edge 107. There is an area between the disk's circumferential edge 107 and the outer diameter of the data zone 104. Commonly, the annular stop/start zone 103 has an outer diameter of 64 mm which is substantially less than said diameter of the disk 100. The stop/start zone's inner diameter is commonly 56 mm. Therefore, the annular stop/start zone 103 is 4 mm wide, which is the width of most read/write heads. For read/write heads of different sizes and disks of different diameters, the stop/start zone 103 is configured accordingly.

The metal disk substrate of the magnetic-recording disk 100 is an aluminum alloy such as UNS A95052 or UNS A95086, a titanium alloy such as UNS R56320, an austenitic stainless steel such as UNS S20910, UNS S30100, or UNS S31600, or any suitable metal for producing substrates used in making magnetic-recording disks. The texturing of the start/stop zone 103 of the present invention occurs directly on the metal substrate by using a laser, an ion-beam etching process, a reactive ion-beam etching process, or a chemical etching process. The textured pattern is circumferential. The data zone 104 of the metal substrate disk is not textured and therefore remains substantially smooth. Texturing is accomplished by locally melting the metal disk substrate surface with a laser beam. The molten metal immediately solidifies leaving behind an imprint on the metal substrate disk. The laser-beam parameters, such as power and amplification, are dependent upon the type of metal substrate upon which the laser beam is incident, and the depth and width of the grooves or indentations desired. By either rotating the disk while applying the laser beam to the substrate's surface or by having the substrate remain stationary and moving the laser beam by using galvo-controlled mirrors to move the laser beam through the desired pattern, circumferential grooves or indentations are made. The position of the beam with respect to the substrate can be effected by computer control, therefore, evenly positioning grooves or indentations on the substrate surface so that a circumferential pattern emerges.

Similar parameters to laser texturing are considered when texturing with ion-beam etching, reactive ion-beam etching, or chemical etching. Any other means for providing a textured stop/start zone on the metal disk substrate is within the scope of the present invention. The texturing on the metal disk substrate, of course, may take on a variety of configurations.

Figure 2:
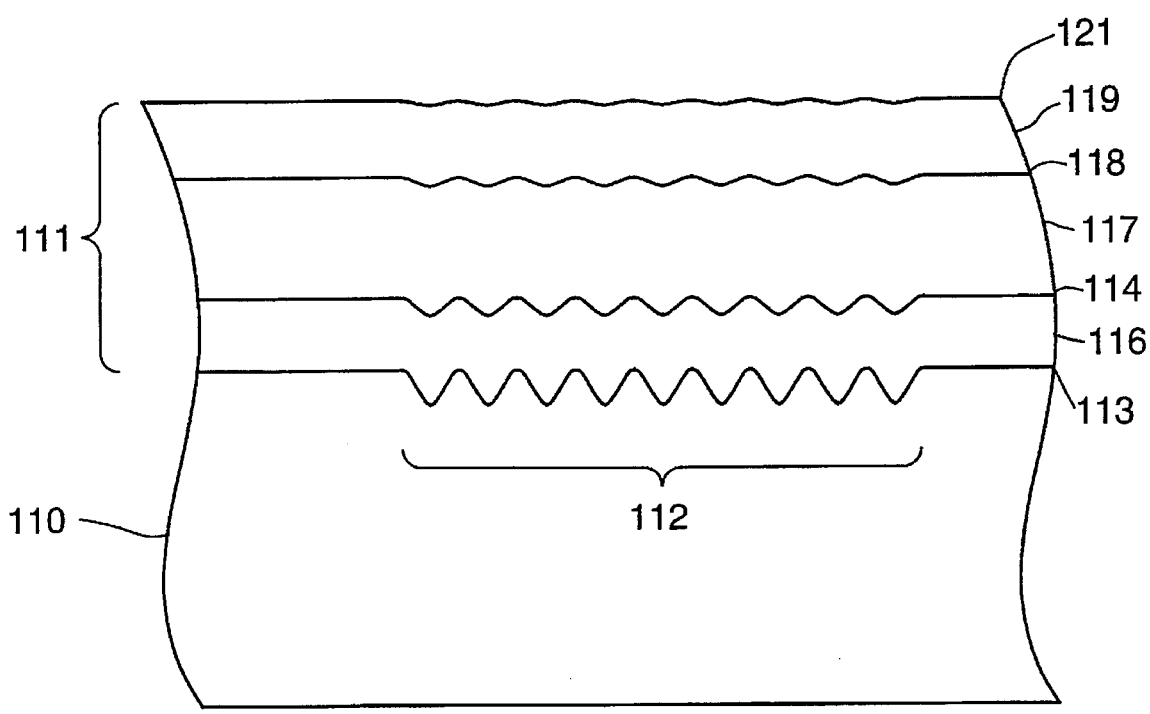
FIG. 2 is a cutaway side view of the disk substrate with a thin-film levelizing coating applied thereon.

FIG. 2 shows a cutaway side view of the metal disk substrate 110 with a thin-film levelizing coating 111 applied thereon, prior to application of the magnetic-recording media. The metal disk substrate 110 is etched with a circumferential pattern 112 on its surface 113. The disk substrate 110 surface 113 is coated with a material that can be deposited by evaporative reactive ion plating or by reactive sputtering in such a manner that the disk surface will be levelized. One such material is titanium (Ti) combined with the reactive gas, nitrogen ($N_2$). A first layer 116 is applied to surface 113.

The deposition of layer 116 and layer 117, the combination of which can range from 0.5 to 5 microns (the greater the microhardness of the substrate, the lower the coating thickness required) of the partially levelized Ti/TiN material over the etched start/stop zone 112, reduces the average surface roughness considerably. The amplitude of the average surface roughness at the surface 118 of the Ti/TiN layer is adjustable by changing the depth of the etched grooves or indentations 112 and/or the thickness of the levelizing Ti/TiN layer. Preferably, the average surface roughness of surface 118 is 1–3 nm.

The peak-to-valley distance preferably of 1–3 nm of the textured and then subsequently levelized surface 118 provides a surface having reduced stiction characteristics. The wave-like peak-to-valley configuration of surface 118 provided by a circular etched pattern on the substrate further allows the head to quickly establish its air-bearing surface, thus assisting in a beneficial reduction of wear of the start/stop zone 103.

The benefits discussed directly above with respect to a wave-like peak-to-valley configuration are a result of the levelizing layers applied to the textured substrate. Any other substrate texturing configuration and subsequently applied levelizing coating would provide a similar benefit.

The microhardness of the last 10 nm thickness of the TiN layer 119 is decreased by reducing the quantity of the nitrogen gas during the last phase of deposition of layer 111. The coating 111 provides an outer surface 121 having a microhardness gradient that varies from a Vickers microhardness of 3000 kg/mm$^2$ to one of about 800 kg/mm$^2$. The thin gradient microhardness outer layer provides very narrow sharp texturing grooves with small height protrusions.

Coating 111 may instead be comprised of a thin film selected from the group consisting of nitrides, carbides, or borides of titanium, zirconium, hafnium, vanadium, niobium, tantalum, chromium, molybdenum, or tungsten. Details for the application of coating 111 are fully described in patent application Ser. No. 07/771,348, filed Oct. 4, 1991, naming as inventors, the present inventors, which is herein incorporated by reference.

Under certain circumstance, surface 121 of the entire disk 100 is abrasively textured by a rotating surface containing very fine alumina particles of 0.05 to 0.2 microns in size. As described above, a very fine circumferential texturing (not shown) provides an in-plane circumferential versus radial anisotropy, improving the read-signal parametrics of anisotropic cobalt-alloy films. Such texturing is applied only on substrates for anisotropic magnetic films. This size of alumina particles and the outer layer 119 with a thin (10 nm) gradient microhardness outermost layer will produce a circumferential pattern having an arithmetic average surface roughness of 1–2 nm with a peak-to-valley distance of 10 nm.

The configuration of the present invention provides that the contact pressure between the transducer's air-bearing surface and the smooth nearly levelized etched-grooves' or indentations' edges is evenly distributed. Moreover, the high pressure points which can cause excessive disk wear are also eliminated. Also, these smooth levelized etched-groove edges have the protection of the ultra-hard (3000 kg/mm$^2$ Vickers microhardness) TiN/Ti undercoating, therefore resisting wear from the transducer air-bearing surface pressure when the head comes in contact with the disk surface. Clearly, the objects of the present invention to provide a textured start/stop zone which resists wear and is void of any sharp points are accomplished by the present invention.

Also, the gradient microhardness outermost layer of the levelized Ti/TiN undercoating provides a surface that can be microhardness-tuned to a circumferential texturing process that will assist in providing average roughness and peak-to-valley distances which will allow the transducer to fly at or below 50 nm (2 micro-inches). Therefore, the object of the present invention to provide a smooth data zone allowing the transducer's air-bearing surface to fly close to the surface of the disk has been met.

While the present invention has been shown and described in what is presently conceived to be the most practical and preferred embodiment of the invention, it will become apparent to those of ordinary skill in the art that many modifications thereof may be made within the scope of the invention, which scope is to be accorded the broadest interpretation of the claims so as to encompass all equivalent structures.

We claim:

1. A magnetic-recording disk comprising:
   a metal substrate disk that is uncoated prior to the application of a thin-film coating onto a surface of the metal substrate disk;
   said thin-film coating on said surface of the metal substrate disk, wherein the material of the thin-film coating has a material hardness greater than that of the metal substrate disk and is selected from the group consisting of nitrides, carbides, and borides of titanium, zirconium, hafnium, vanadium, niobium, tantalum, chromium, molybdenum, or tungsten, and wherein either an annular area of an outer surface of the thin-film coating is textured or an annular area of said surface of the metal substrate disk is textured; and
   a layer of magnetic-recording material composed of cobalt or a cobalt alloy and overlying said thin-film coating, wherein the layer of magnetic-recording material overlies and replicates the texturing of the thin-film coating or the metal substrate disk.

2. A magnetic-recording disk as recited in claim 1 wherein an annular area of the metal substrate disk is textured, and wherein the thin-film coating replicates the texturing of the underlying metal substrate disk.

3. A magnetic-recording disk as recited in claim 1 wherein the metal substrate disk is not textured, and wherein an annular area of the outer surface of the thin-film coating is textured.

4. A magnetic-recording disk as recited in claim 1 wherein the thin-film coating comprises a layer of the metal constituent of the thin-film coating contacting said surface of the metal substrate disk.

5. A magnetic-recording disk as recited in claim 1 wherein the thin-film coating comprises an inner region contacting said surface of the metal substrate disk and composed of the metal constituent of the thin-film coating, comprises an intermediate region adjacent to the inner region and composed of a nitride, carbide, or boride of titanium, zirconium, hafnium, vanadium, niobium, tantalum, chromium, molybdenum, or tungsten, and comprises an outer region adjacent to the intermediate region and having a material hardness that is less than the material hardness of the intermediate region of the thin-film coating.

6. A magnetic-recording disk as recited in claim 1 wherein the thickness of the thin-film coating is within the range of 0.5 to 5.0 microns.

7. A magnetic-recording disk as recited in claim 3 wherein the material hardness of the thin-film coating is softer at an outer surface thereof than below the outer surface.

8. A magnetic-recording disk as recited in claim 7 wherein the outer surface of the thin-film coating is abrasively textured.

9. A magnetic-recording disk comprising:
   a metal substrate disk;
   a thin-film coating on a surface of the metal substrate disk, wherein the material of the thin-film coating has a material hardness greater than that of the metal substrate disk and is selected from the group consisting of carbides and borides of titanium, zirconium, hafnium, vanadium, niobium, tantalum, chromium, molybdenum, or tungsten, and wherein either an annular area of an outer surface of the thin-film coating is textured or an annular area of said surface of the metal substrate disk is textured; and
   a layer of magnetic-recording material that overlies the thin-film coating and replicates the texturing of the thin-film coating or the metal substrate disk.

10. A method for manufacturing magnetic-recording media, including the steps of:
    providing a metal substrate disk;
    applying a thin-film coating to a surface of the metal substrate disk, wherein the thin-film coating has a material hardness greater than that of the metal substrate disk and is selected from the group consisting of nitrides, carbides and borides of titanium, zirconium, hafnium, vanadium, niobium, tantalum, chromium, molybdenum, or tungsten, and wherein either an annular area of an outer surface of the thin-film coating is textured or an annular area of said surface of the metal substrate disk is textured; and
    applying a layer of magnetic-recording material composed of cobalt or a cobalt alloy and overlying the thin-film coating to form a magnetic-recording medium having an outer surface at least a portion of which is textured.

11. A method as recited in claim 10 further comprising a step of texturing an annular area of the metal substrate disk and thereafter applying the thin-film coating to replicate the texturing of the metal substrate disk.

12. A method as recited in claim 10 further comprising a step of texturing an annular area of the outer surface of the thin-film coating.

13. A method as recited in claim 10 wherein the step of applying a thin-film coating includes the steps of first applying a inner coating of the metal constituent of the thin-film coating to the outer surface of the metal substrate disk, and then applying an intermediate coating of a nitride, carbide, or boride of titanium, zirconium, hafnium, vanadium, niobium, tantalum, chromium, molybdenum, or tungsten, and then applying an outer coating having a material hardness that is less than the material hardness of the intermediate coating.

14. A method as recited in claim 10 further comprising the step of applying an underlayer of material after applying the thin-film coating and before applying the layer of magnetic-recording material, wherein the underlayer causes the magnetic-recording material to crystallize in a desired orientation.

15. A method as recited in claim 10 wherein the step of applying the thin-film coating results in a thin-film coating thickness within the range of 0.5 to 5.0 microns.

16. A method as recited in claim 10 wherein the step of applying a thin-film coating includes the steps of first applying a inner coating of the metal constituent of the thin-film coating to said surface of the metal substrate disk, and then applying an intermediate coating of a nitride, carbide, or boride of titanium, zirconium, hafnium, vanadium, niobium, tantalum, chromium, molybdenum, or tungsten.

17. A method as recited in claim 12 wherein the thin-film coating includes an outer region having a material hardness at the outer surface thereof that is less than the material hardness of the thin-film coating in a region below the outer region.

18. A method as recited in claim 17 further comprising a step of texturing the outer surface of the thin-film coating by abrasion.

19. A method as recited in claim 17 wherein the hardness of the outer region is controlled by controlling the percent content of the reacted nitrogen, carbon, or boron constituent during deposition of the outer region.

* * * * *